(12) United States Patent
Byun et al.

(10) Patent No.: US 11,639,099 B2
(45) Date of Patent: May 2, 2023

(54) ACTIVE AIR FLAP APPARATUS FOR VEHICLE

(71) Applicant: HYUNDAI MOBIS Co., Ltd., Seoul (KR)

(72) Inventors: Jae Sup Byun, Gwangmyeong-si (KR); Kyeong Am Lee, Yongin-si (KR)

(73) Assignee: HYUNDAI MOBIS Co., Ltd., Seoul (KR)

(*) Notice: Subject to any disclaimer, the term of this patent is extended or adjusted under 35 U.S.C. 154(b) by 0 days.

(21) Appl. No.: 17/545,277

(22) Filed: Dec. 8, 2021

(65) Prior Publication Data
US 2022/0176809 A1 Jun. 9, 2022

(30) Foreign Application Priority Data
Dec. 8, 2020 (KR) .................. 10-2020-0170872

(51) Int. Cl.
*B60K 11/08* (2006.01)
*B60K 11/00* (2006.01)
*F01P 7/10* (2006.01)

(52) U.S. Cl.
CPC ............. B60K 11/085 (2013.01); F01P 7/10 (2013.01)

(58) Field of Classification Search
CPC ....... F01P 7/10; F01P 3/02; F01P 7/12; B60K 11/085; B60K 11/04
See application file for complete search history.

(56) References Cited

U.S. PATENT DOCUMENTS

| | | | |
|---|---|---|---|
| 9,914,351 B2* | 3/2018 | Kim | B60K 11/085 |
| 2011/0073395 A1* | 3/2011 | Lee | F01P 7/12 |
| | | | 180/68.1 |
| 2011/0232981 A1* | 9/2011 | Hori | B60K 11/085 |
| | | | 180/68.1 |
| 2012/0074729 A1* | 3/2012 | Fenchak | B60K 11/085 |
| | | | 296/193.1 |
| 2016/0089971 A1* | 3/2016 | Asai | B60K 11/085 |
| | | | 296/193.1 |
| 2017/0080986 A1* | 3/2017 | Yoon | B62D 37/02 |
| 2018/0099558 A1* | 4/2018 | Jeong | B60K 11/085 |
| 2021/0122433 A1* | 4/2021 | Solazzo | H02J 50/001 |

FOREIGN PATENT DOCUMENTS

| | | |
|---|---|---|
| EP | 2621747 | 8/2013 |
| EP | 2754579 A1 | 7/2014 |
| FR | 3036662 A1 | 12/2016 |
| KR | 10-2011-0029370 A | 3/2011 |
| KR | 10-2015-0070769 A | 6/2015 |
| WO | 2012/047528 A2 | 4/2012 |
| WO | 2016/097589 A1 | 6/2016 |

* cited by examiner

*Primary Examiner* — Long T Tran
(74) *Attorney, Agent, or Firm* — Morgan, Lewis & Bockius LLP

(57) ABSTRACT

The present disclosure relates to an active air flap apparatus for a vehicle coupled to an air inlet of a grill to cool the inside of an engine room when a vehicle travels, and the active air flap apparatus for a vehicle includes a frame coupled to a rear surface of the grill in which the air inlet is formed, a plurality of flap portions coupled to an inside of the frame to open or close the air inlet and arranged in a vertical direction of the frame, an actuator coupled to an outside of the frame to generate power, a gear unit operated by the power generated from the actuator, and a connection unit connecting the flap portions and the gear unit to each other to operate the flap portions according to the operation of the gear unit.

15 Claims, 7 Drawing Sheets

300: 300_3, 300_2, 300_1
520: 521, 524, 523, 522

ACTIVE AIR FLAP APPARATUS FOR VEHICLE

CROSS-REFERENCE TO RELATED APPLICATION

This application claims priority to and the benefit of Korean Patent Application No. 10-2020-0170872, filed on Dec. 8, 2020, the disclosure of which is incorporated herein by reference in its entirety.

BACKGROUND

1. Technical Field

The present disclosure relates to an active air flap apparatus, and more particularly, to an active air flap apparatus for a vehicle that is coupled to an air inlet of a grill to cool the inside of an engine room when a vehicle travels.

2. Discussion of Related Art

In heat exchangers, a heat exchange medium generally flows therein. The heat exchange medium inside the heat exchanger and air outside the heat exchanger exchange heat with each other, and thus, cooling or heat radiating is performed.

In order to stably operate various heat exchangers in an engine room of a vehicle, external air is required to be smoothly supplied into the engine room.

However, when a vehicle travels at a high speed, a large amount of outside air is introduced at high speed, and thus, air resistance becomes very large. Therefore, there is a problem in that fuel efficiency of the vehicle is reduced.

To solve this problem, an active air flap (AAF) has been developed, which improves fuel efficiency by increasing an opening angle during low-speed traveling to increase an amount of air introduced into the engine room, and reducing the opening angle during high-speed traveling to reduce the amount of air inflow.

An active air flap includes a flap member, and the flap member is mounted on a rear surface of a grill and rotates to open or close an air inlet formed in the grill according to an operation of an actuator.

The air inlet is opened or closed according to the rotation of the flap member, and thus, external air is introduced through the air inlet or blocked.

Specifically, when the vehicle travels at high speed, the flap member closes the air inlet to reduce air resistance to improve fuel efficiency, and when the vehicle travels at low speed, the flap member opens the air inlet to allow air to flow into the engine room so as to cool the overheated engine room.

A flap portion constituting the active air flap is provided as a plurality of flap portions to open or close the air inlet.

In general, the plurality of flap portions are simultaneously operated by driving of an actuator, and thus, the plurality of flap portions are rotated.

Accordingly, in the plurality of flap portions, as a traveling pressure increases while a vehicle travels, a torque of the actuator rotating the flap portions inevitably increases.

A structure of the active air flap has one of various forms.

Among the structures of the active air flap having one of various forms, in a case of a structure in which a rotating shaft is fixed to a central portion of a flap portion in a width direction, the flap portion is opened or closed by rotating 90° by the rotating shaft.

In this case, in order to easily rotate the flap portion, the flap portion should protrude to the outside of a bumper.

SUMMARY

The present disclosure is directed to providing an active air flap apparatus for a vehicle capable of effectively operating an active air flap by integrating a front surface of a flap portion and a front surface of a grill and minimizing the influence of air when the active air flap is operated.

The above and other objects, advantages, and features of the present disclosure, and a method for achieving them will become apparent with reference to the embodiments described below in detail in conjunction with the accompanying drawings.

According to an embodiment of the present disclosure, there is provided an active air flap apparatus for a vehicle, including a frame coupled to a rear surface of a grill in which an air inlet is disposed, a plurality of flap portions coupled to an inside of the frame to open or close the air inlet and arranged in a vertical direction of the frame, an actuator coupled to an outside of the frame to generate power, a gear unit operated by the power generated from the actuator, and a connection unit connecting the plurality of flap portions and the gear unit to each other to operate the plurality of flap portions according to the operation of the gear unit.

The frame may include two vertical frames disposed to be spaced a distance from each other and two horizontal frames disposed on upper end portions and lower end portions of the vertical frames to connect the two vertical frames.

A guide groove, which guides an operation direction of the connection unit when the power of the actuator is generated, may extend in the horizontal frame.

Each of the plurality of flap portions may include a body portion configured to open or close the air inlet and a coupling unit extending in a direction toward an engine room from a rear surface of the body portion and coupled to the connection unit.

The connection unit may include a rotation rod connected to the gear unit, a guide rod which is inserted into the guide groove and coupled to which the plurality of flap portions which are spaced from each other by a distance in a longitudinal direction, and a link unit, a number of which corresponds to that of the plurality of flap portions, connecting the rotation rod and the guide rod to each other.

The connection unit may further include a driven gear coupled to an end portion of the rotation rod and engaged with the gear unit to receive power from the gear unit and rotate the rotation rod.

A first end of the rotation rod may be coupled to the horizontal frame disposed on an upper side and a second end of the rotation rod may be coupled to the horizontal frame disposed on a lower side to connect the two horizontal frames to each other.

Each of the plurality of flap portions may include a body portion configured to open or close the air inlet, and a coupling unit extending in a direction toward an engine room from a rear surface of the body portion and coupled to the connection unit, in which the guide rod may pass through the coupling unit and be coupled to the flap portion.

The guide rod may be disposed adjacent to the flap portion, and the rotation rod may be spaced from the guide rod by a distance in a direction toward an engine room.

The link unit may include a first link member having one end fixed to the rotation rod and configured to rotate together with the rotation rod and a second link member having one end rotatably coupled to the first link member and the other end rotatably coupled to the guide rod.

A rotating shaft passing through the horizontal frame may be coupled to the actuator, and the actuator may be fixed outside the horizontal frame to transmit power to the gear unit.

The gear unit may include a pinion gear connected to an end portion of the rotating shaft and rotated by receiving the power from the actuator, a rack gear engaged with the pinion gear and the driven gear and configured to rotate the rotation rod according to the power of the actuator transmitted from the pinion gear, and a gear cover sealing the driven gear, the pinion gear, and the rack gear.

According to another embodiment of the present disclosure, there is provided an active air flap apparatus for a vehicle, including a frame coupled to a rear surface of a grill in which an air inlet is disposed, a plurality of flap portions coupled to an inside of the frame to open or close the air inlet and arranged in a vertical direction of the frame, an actuator coupled to an outside of the frame to generate power, a gear unit operated by the power generated from the actuator, and a connection unit connecting the plurality of flap portions and the gear unit to each other to operate the plurality of flap portions according to the operation of the gear unit, in which the plurality of flap portions constitute a plurality of flap units arranged in a horizontal direction.

The frame may include two vertical frames disposed to be spaced a distance from each other, and two horizontal frames disposed on upper end portions and lower end portions of the vertical frames to connect the two vertical frames, and the flap unit may include a first unit disposed at a center of the horizontal frame in the horizontal direction, a second unit disposed on the horizontal frame spaced a distance from the first unit, and a third unit disposed on the horizontal frame in a direction opposite to the direction in which the first unit is disposed from the second unit.

The connection unit may include a rotation rod connected to the gear unit, a guide rod which is inserted into the guide groove and coupled to the plurality of flap portions which are spaced from each other by a distance in a longitudinal direction, and a link unit, a number of which corresponds to that of the flap portions, connecting the rotation rod and the guide rod to each other, and the connection unit may include a first connection unit connected to the first unit, a second connection unit spaced from the first connection unit by a distance and connected to the second unit, and a third connection unit spaced from the second connection unit by a distance in a direction opposite to a direction in which the first connection unit is disposed and connected to the third unit.

The gear unit may include a pinion gear connected to an end portion of the rotating shaft and rotated by receiving the power from the actuator, and a rack gear configured to selectively rotate the rotation rod according to the power of the actuator transmitted from the pinion gear, and the rack gear may include a gear base portion forming a body, a first gear disposed at the gear base and engaged with a driven gear of the first connection unit, a second gear disposed at a position of the gear base portion spaced apart from the first gear and selectively engaged with a driven gear of the second connection unit, and a third gear disposed at a position of the gear base portion spaced apart from the second gear by a distance greater than a distance between the first gear and the second gear and selectively engaged with a driven gear of the third connection unit.

The first unit, the second unit, and the third unit may be sequentially operated according to respective distances between the first gear engaged with the driven gear of the first connection unit, the second gear engaged with the driven gear of the second connection unit, and the third gear engaged with the driven gear of the third connection unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
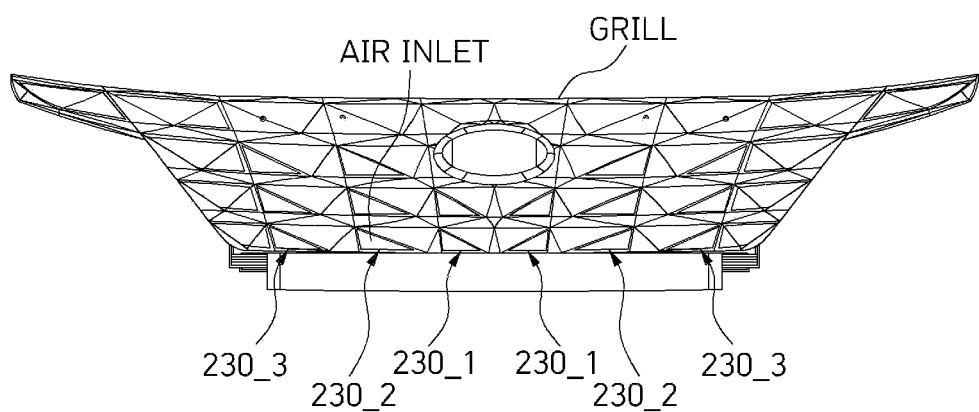
FIG. 1 is a front view illustrating a state in which an active air flap apparatus for a vehicle of the present disclosure closes a grill.

Embodiments of the present disclosure are provided to more completely explain the present disclosure to those of ordinary skill in the art, and the following embodiments may be modified into various other forms, and the scope of the present disclosure is not limited to the following embodiments. The embodiments are provided so that this disclosure will be more thorough and complete, and will fully convey the spirit of the disclosure to those skilled in the art. In addition, in the accompanying drawings, each component is exaggerated for convenience and clarity of description, and the same reference numerals refer to the same elements in the drawings. As used herein, the term "and/or" includes any one or all possible combinations of the listed items.

The terminology used herein is used to describe specific embodiments, not to limit the present disclosure.

As used herein, the singular form may include the plural form unless the context clearly dictates otherwise. Moreover, as used herein, "comprise" and/or "comprising" refers to the presence of the recited shapes, numbers, steps, operations, members, elements, and/or groups thereof, and does not exclude the presence or addition of one or more other shapes, numbers, steps, operations, members, elements and/or groups thereof.

Hereinafter, exemplary embodiments of the present disclosure will be described in detail with reference to the accompanying drawings.

Figure 2:
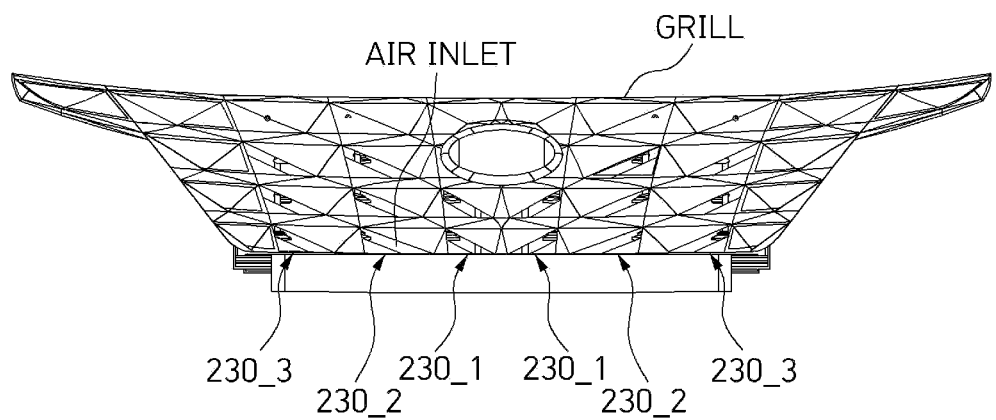
FIG. 2 is a front view illustrating a state in which the active air flap apparatus for a vehicle of the present disclosure opens the grill.
Figure 3:
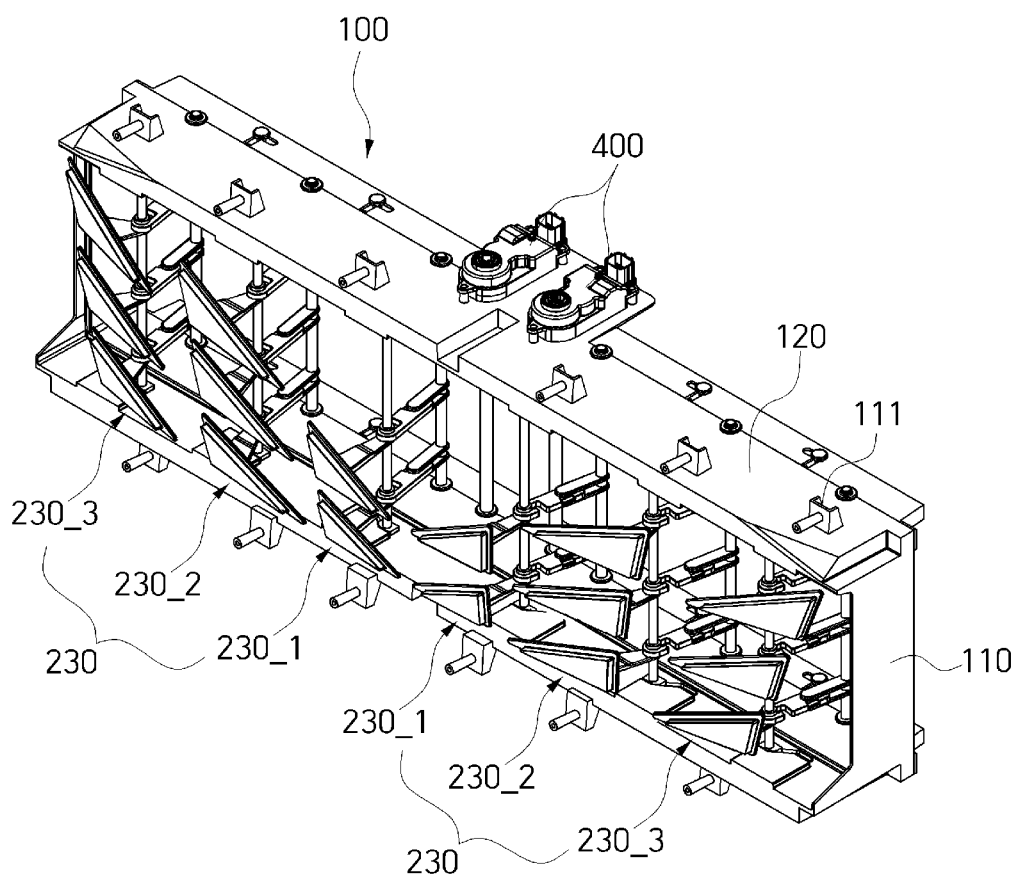
FIG. 3 is a perspective view illustrating the active air flap apparatus for a vehicle of the present disclosure when viewed in one direction.
Figure 4:
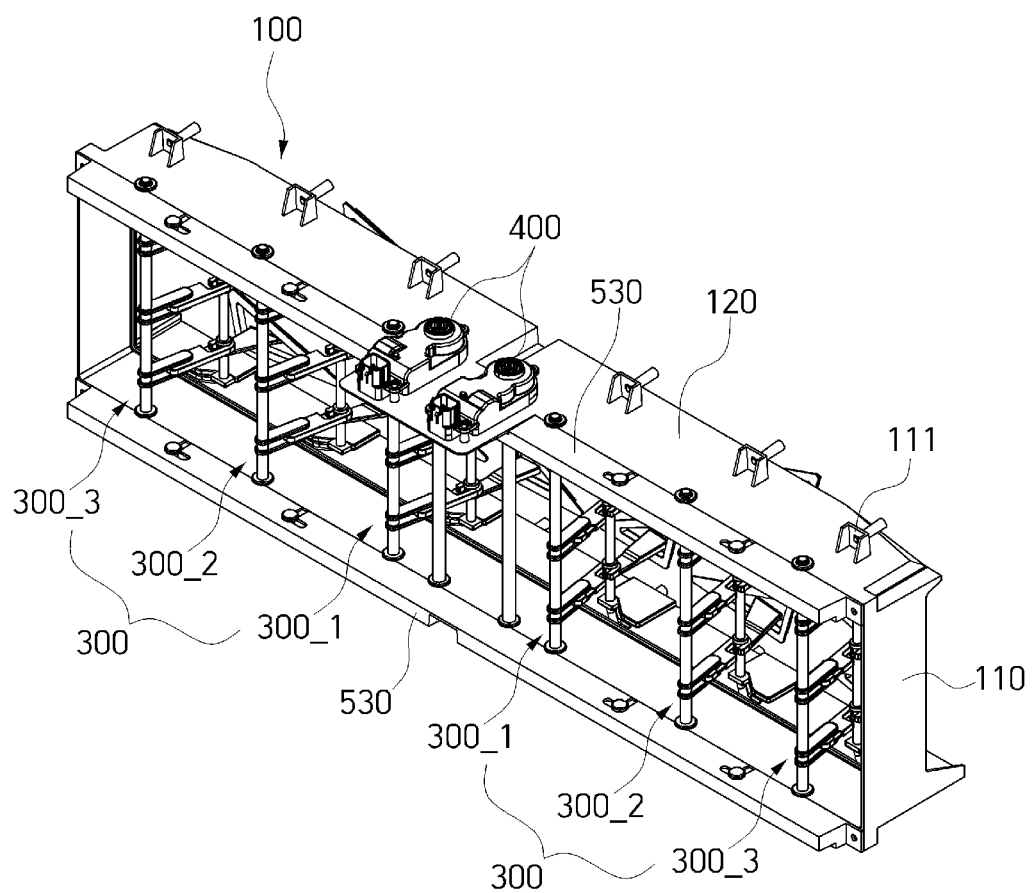
FIG. 4 is a perspective view illustrating the active air flap apparatus for a vehicle of the present disclosure when viewed in the other direction.
Figure 5:
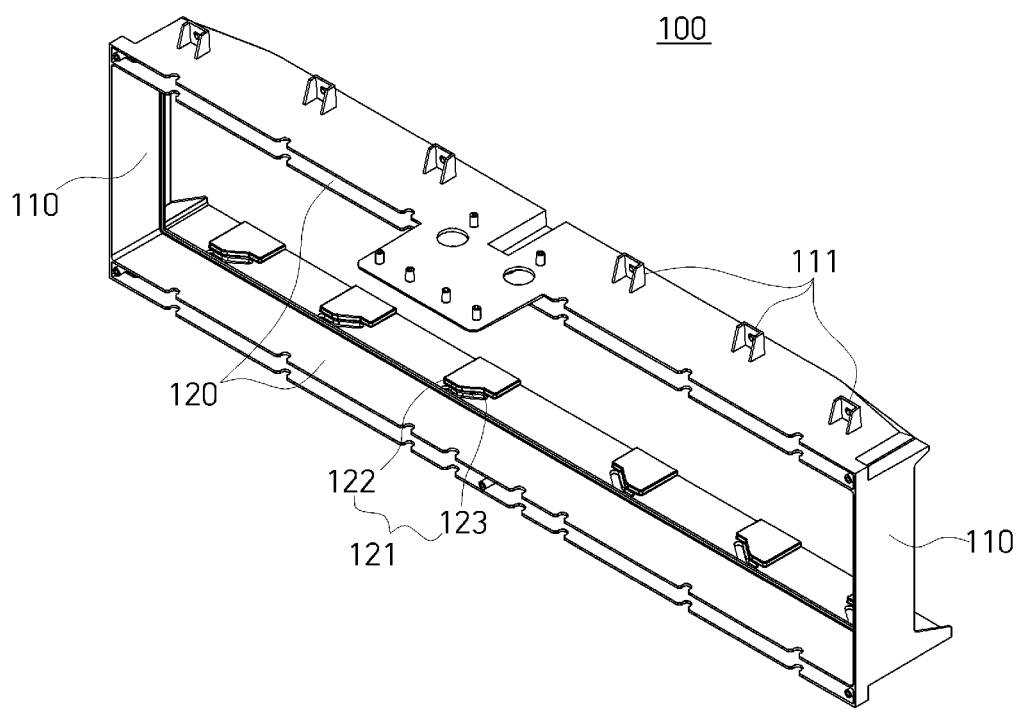
FIG. 5 is a perspective view illustrating a frame of the active air flap apparatus for a vehicle of the present disclosure.
Figure 6:
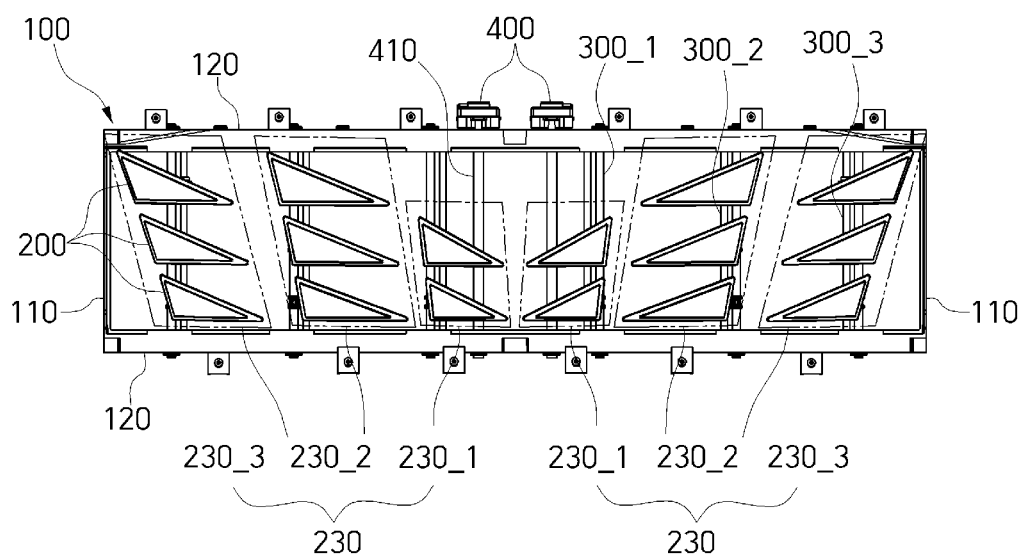
FIG. 6 is a front view illustrating a front surface of the active air flap apparatus for a vehicle of the present disclosure.
Figure 7:
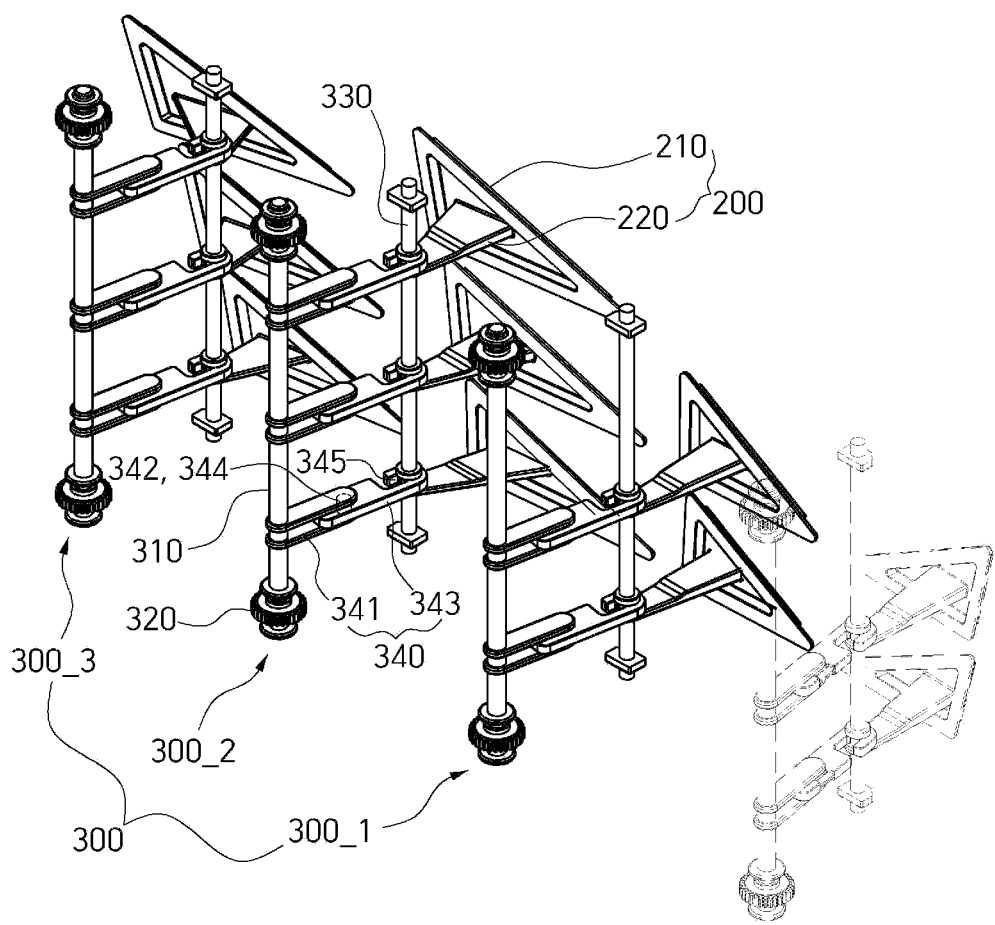
FIG. 7 is a perspective view illustrating a flap portion and a connection unit of the active air flap apparatus for a vehicle of the present disclosure.
Figure 8:
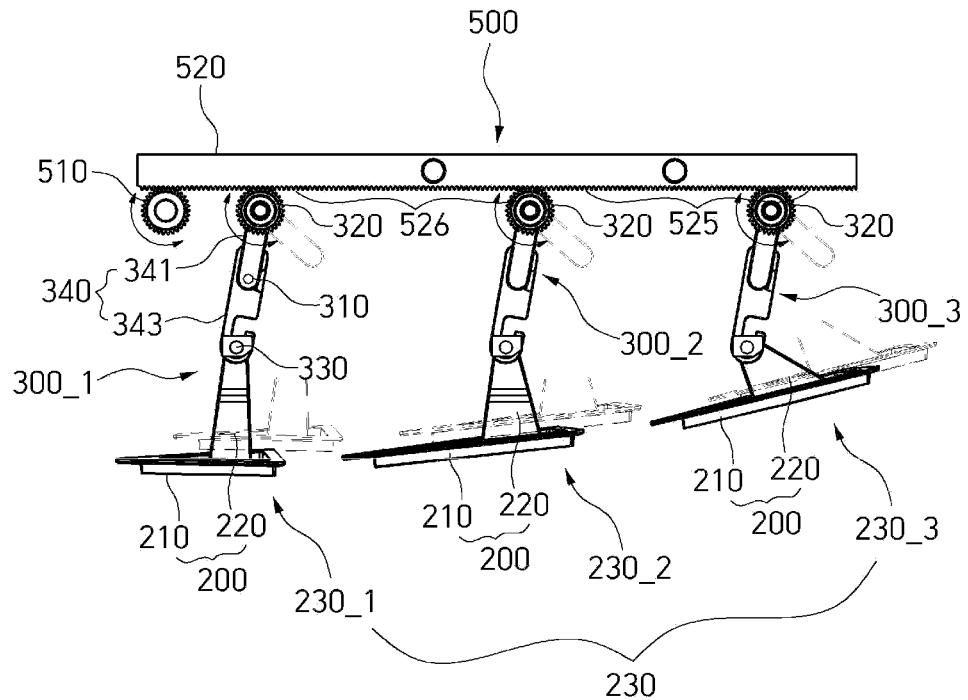
FIG. 8 is a plan view illustrating the flap portion and the connection unit coupled to a gear unit of the active air flap apparatus for a vehicle of the present disclosure.
Figure 9A:
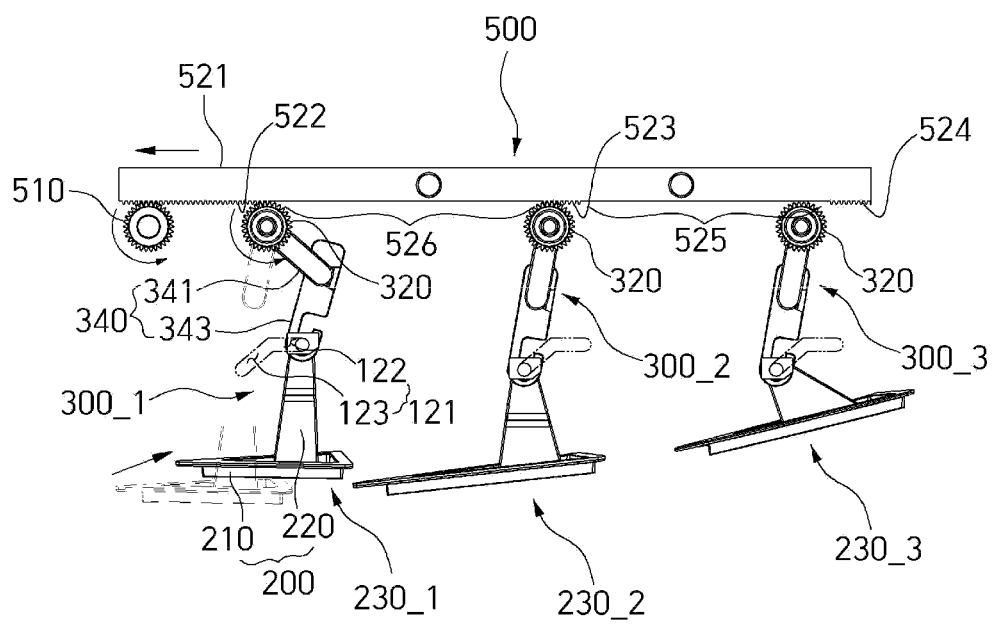
FIGS. 9A to 9C are operational views illustrating an operating state of the active air flap apparatus for a vehicle of the present disclosure.
Figure 9B:
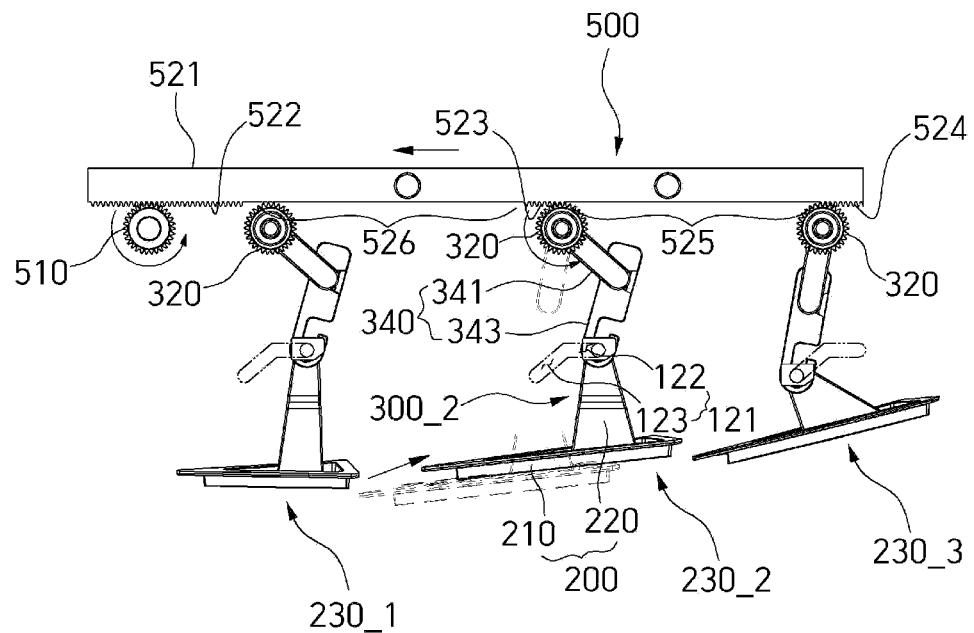
Figure 9C:
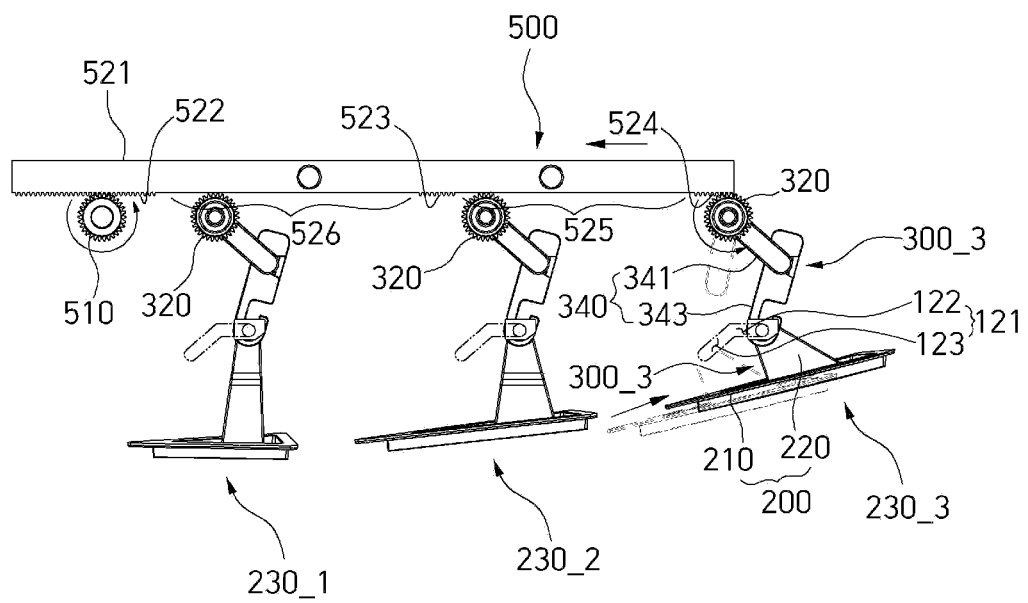

FIG. 1 is a front view illustrating a state in which an active air flap apparatus for a vehicle of the present disclosure closes a grill, FIG. 2 is a front view illustrating a state in which the active air flap apparatus for a vehicle of the present disclosure opens the grill, FIG. 3 is a perspective view illustrating the active air flap apparatus for a vehicle of the present disclosure when viewed in one direction, FIG. 4 is a perspective view illustrating the active air flap apparatus for a vehicle of the present disclosure when viewed in the other direction, FIG. 5 is a perspective view illustrating a frame of the active air flap apparatus for a vehicle of the present disclosure, FIG. 6 is a front view illustrating a front surface of the active air flap apparatus for a vehicle of the present disclosure, FIG. 7 is a perspective view illustrating a flap portion and a connection unit of the active air flap apparatus for a vehicle of the present disclosure, FIG. 8 is a plan view illustrating the flap portion and the connection unit coupled to a gear unit of the active air flap apparatus for a vehicle of the present disclosure, and FIGS. 9A to 9C are operational views illustrating an operating state of the active air flap apparatus for a vehicle of the present disclosure.

Referring to FIGS. 1 to 8 and 9A to 9C, the active air flap apparatus for a vehicle according to one embodiment of the present disclosure includes a frame 100, a flap portion 200, a connection unit 300, and an actuator 400, and a gear unit 500.

The frame 100 has a quadrangle frame shape and is coupled to an air inlet region formed in the grill on a rear surface of the grill.

In addition, various components such as the flap portion 200, the connection unit 300, the actuator 400, and the gear unit 500 may be coupled to the frame 100.

The frame 100 is coupled to the rear surface of the grill by a screw-coupling method.

To this end, as illustrated in FIGS. 3 to 5, a plurality of fixing units 111 are formed on a periphery of the frame 100 to be spaced apart from each other along a perimeter of the frame 100.

Then, a screw member passes through each of the fixing units 111 in a direction toward the grill and is coupled to the rear surface of the grill.

Accordingly, the frame 100 can be firmly fixed to the grill by the screw members passing through the fixing units 111 and coupled to the grill.

The frame 100 includes vertical frames 110 and horizontal frames 120.

Referring to FIG. 5, the vertical frames 110 includes two panels and are horizontally spaced apart from each other in the air inlet region of the grill rear surface.

The vertical frames 110 are disposed on both sides of the air inlet.

That is, when the vertical frames 110 are viewed from a front surface of the grill, the vertical frames 10 are covered by the grill and are not exposed to the outside.

Referring to FIG. 5, the horizontal frames 120 include two panels and are vertically spaced apart from each other in the air inlet area of the grill rear surface.

In addition, the horizontal frames 120 are disposed on upper end portions and lower end portions of the two vertical frames 110 to connect the vertical frames 110 to each other.

Accordingly, the frame 100 is entirely formed in a quadrangular frame shape due to the vertical frames 110 and the horizontal frames 120.

Moreover, the horizontal frames 120 are disposed at the upper and lower portions of the air inlet.

That is, when the horizontal frames 120 are viewed from the front surface of the grill, the horizontal frames 120 are covered by the grill and are not exposed to the outside.

A guide groove 121 is formed in the horizontal frame 120.

The guide groove 121 is formed in the pair of horizontal frames 120 spaced apart from each other in the vertical direction, and when power of the actuator 400 is generated, the guide groove 121 guides an operation direction of the connection unit 300.

Moreover, preferably, the guide groove 121 is provided as a plurality of guide grooves, and the guide grooves 121 are formed to be spaced apart from each other in the horizontal direction in the pair of horizontal frames 120 spaced by a distance in the vertical direction.

The guide groove 121 includes a horizontal portion 122 and an inclined portion 123.

The horizontal portion 122 is formed in a longitudinal direction of the horizontal frame 120, and the inclined portion 123 is formed to extend obliquely from an end portion of the horizontal portion 122 in the horizontal frame 120.

Accordingly, when the connection unit 300 is positioned at the end portion of the horizontal portion 122 of the guide groove 121, the flap portion 200 opens the air inlet, and when the connection unit 300 is positioned at the end portion of the inclined portion 123, the flap portion 200 closes the air inlet.

Meanwhile, flap portions 200, connection units 300, actuators 400, and gear units 500 coupled to the frame 100 may be formed horizontally symmetrically based on a central portion of the frame 100 as illustrated in FIGS. 1 to 4.

Hereinafter, in order to easily explain technical features of the present disclosure, example components formed on any one side based on the central portion of the frame 100 will be described.

The flap portions 200 open or close the air inlet formed on the grill as illustrated in the drawing.

When the flap portions 200 are opened while a vehicle travels, air is introduced through the air inlet from the outside of the grill to cool the engine room.

Accordingly, the flap portions 200 can effectively cool the inside of the engine room according to the opening or closing of flap portions 200.

Moreover, the flap portions 200 are provided as a plurality of flap portions and are arranged to be spaced a distance from each other along the vertical direction of the vertical frame 110 to form a flap unit 230.

Moreover, the grill is formed between the plurality of flap units 230 spaced apart from each other.

The flap units 230 are formed in a number and at positions corresponding to the guide grooves 121 spaced apart from each other in the horizontal direction in the horizontal frame 120.

That is, the flap portions 200 are arranged in the vertical direction of the vertical frame 110 to form the flap units 230, and the plurality of flap units 230 are arranged in the horizontal direction to correspond to the guide grooves 121.

Each flap unit 230 includes a first unit 230_1, a second unit 230_2 and a third unit 230_3 as illustrated in FIGS. 3 and 6.

The first unit 230_1 is disposed at a center of the horizontal frame 120 in the horizontal direction.

The first unit 230_1 is disposed at a position corresponding to the guide groove 121, which is formed at the center of the horizontal frame 120 in the horizontal direction, among the plurality of guide grooves 121 formed in the horizontal frame 120, and slidably coupled to the corresponding guide groove 121.

The second unit 230_2 is disposed in a position spaced apart from the first unit 230_1 in the horizontal frame 120.

The second unit 230_2 is disposed at a position corresponding to the guide groove 121 formed at a position spaced apart from the guide groove 121, to which the first unit 230_1 is coupled, among the plurality of guide grooves 121 formed in the horizontal frame 120 and slidably coupled to the corresponding guide groove 121.

The third unit 230_3 is disposed in a direction opposite to the direction in which the first unit 230_1 is disposed from the second unit 230_2 in the horizontal frame 120.

That is, the third unit 230_3 is disposed at an end portion of the horizontal frame 120 in the horizontal direction.

The third unit 230_3 is disposed at a position corresponding to the guide groove 121, which is disposed in a direction opposite to the disposition direction of the guide groove 121 to which the first unit 230_1 is coupled from the guide groove 121 to which the second unit 230_2 is coupled, among the plurality of guide grooves 121 formed in the horizontal frame 120, and slidably coupled to the corresponding guide groove 121.

As described above, each of the plurality of flap portions 200 constituting the flap unit 230 includes a body portion 210 and a coupling unit 220.

The body portion 210 constitutes a body of the flap portion 200, and opens or closes the air inlet.

The body portion 210 has a shape corresponding to a shape of the air inlet formed on the grill.

The coupling unit 220 extends in a direction toward the engine room from a rear surface of the body portion 210, and is coupled to the connection unit 300.

Meanwhile, the flap portions 200 are arranged to be spaced a distance from each other in the vertical direction of the frame 100, and thus, the coupling units 220 are arranged in the vertical direction and coupled to the connection unit 300.

The connection unit 300 is formed in a number and at positions corresponding to the guide grooves 121 as illustrated in FIGS. 4 and 7 and 8 and connects the flap portion 200 and the gear unit 500 to each other.

Moreover, the connection unit 300 operates the flap portion 200 according to the operation of the gear unit 500.

The connection unit 300 includes a rotation rod 310, a driven gear 320, a guide rod 330, and a link unit 340.

The rotation rod 310 is connected to the gear unit 500, spaced a distance from the guide rod 330 in the direction toward the engine room, and rotated according to the operation of the gear unit 500.

In addition, the rotation rod 310 connects the pair of horizontal frames 120 spaced a distance from each other in the vertical direction.

Specifically, one end of the rotation rod 310 is coupled to the horizontal frame 120 disposed on the upper side, and the other end thereof is coupled to the horizontal frame 120 disposed thereunder.

Accordingly, the rotation rod 310 connects a pair of horizontal frames 120 spaced apart from each other in the vertical direction to each other.

Then, the driven gears 320 are coupled to both end portions of the rotation rod 310.

The driven gears 320 are coupled to both end portions of the rotation rod 310 and engaged with the gear unit 500.

Accordingly, the driven gear 320 rotates the rotation rod 310 according to the operation of the gear unit 500 when the gear unit 500 operates.

The driven gears 320 may be integrally formed with both end portions of the rotation rod 310.

Accordingly, the driven gear 320 may securely transmit the power transmitted from the gear unit 500 to the rotating portion.

The guide rod 330 is disposed at a position spaced a distance from the rotation rod 310 in the direction in which the flap portion 200 is disposed inside the frame 100.

That is, the guide rod 330 is disposed adjacent to the flap portion 200.

In addition, both end portions of the guide rod 330 are slidably coupled to the guide grooves 121 formed in the pair of horizontal frames 120.

In particular, the flap portions 200, specifically, the coupling units 220 of the flap portions 200, are coupled to the guide rod 330 spaced a distance from each other in the longitudinal direction of the guide rod 330.

That is, the guide rod 330 passes through the coupling units 220 and is connected to the flap portions 200.

Accordingly, when the guide rod 330 slides along the guide groove 121, the flap portions 200 open or close the air inlet while moving along the guide rod 330.

The link units 340 is formed in a number corresponding to that of the flap portions 200 and connect the rotation rod 310 and the guide rod 330 to each other.

Each of the link units 340 includes a first link member 341 and a second link member 343.

One end of the first link member 341 is fixed to the rotation rod 310, and the other end thereof is rotatably coupled to the second link member 343.

Specifically, one end of the first link member 341 is integrally formed with the rotation rod 310.

For this reason, the first link member 341 rotates together with the rotation rod 310 when the rotation rod 310 is rotated by the gear unit 500.

A coupling protrusion 342 is formed on the first link member 341.

The coupling protrusion 342 is formed on the other end of the first link member 341 and protrudes from one surface of the first link member 341.

Preferably, the coupling protrusion 342 protrudes in a direction in which the second link member 343 is disposed.

Accordingly, the second link member 343 may be easily coupled to the coupling protrusion 342.

One end of the second link member 343 is rotatably coupled to the first link member 341, i.e., the coupling protrusion 342 formed on the other end of the first link member 341, and the other end thereof is rotatably coupled to the guide rod 330.

To this end, a coupling groove 344 and an insertion groove 345 are formed in the second link member 343.

The coupling groove 344 is formed in one end of the second link member 343, and the coupling protrusion 342 formed on the other end of the first link member 341 is rotatably coupled to the coupling groove 344.

The insertion groove 345 is formed in the other end of the second link member 343, and the guide rod 330 passes therethrough.

Meanwhile, preferably, the insertion groove 345 is disposed in a region that does not overlap the coupling unit 220 of the flap portion 200 rotatably coupled to the guide rod 330.

In the connection unit 300 having this structure, in a case where the flap portions 200 open the air inlet, as illustrated in FIG. 8, when the driven gear 320 is rotated counterclockwise based on FIG. 8 according to the operation of the gear unit 500, the rotation rod 310 integrally fixed to the driven gear 320 is rotated counterclockwise together, and the first link member 341 fixed to the rotation rod 310 is rotated counterclockwise together with the rotation rod 310.

In addition, one end of the second link member 343 having the other end rotatably coupled to the first link member 341 is rotatably coupled to the guide rod 330, and thus, when the first link member 341 is rotated counterclockwise, the second link member 343 pulls the guide rod 330 in the rotational direction of the first link member 341.

In this case, the guide rod 330 is slidably coupled to the guide groove 121 of the horizontal frame 120. Therefore, when the guide rod 330 is pulled in the rotation direction of the first link member 341 by the second link member 343, the guide rod 330 slides along the guide groove 121.

In addition, the coupling unit 220 of the flap portion 200 is rotatably fixed to the guide rod 330. Accordingly, when the guide rod 330 slides along the guide groove 121, the flap portion 200 opens the air inlet while moving along the guide rod 330.

For this reason, when the flap portion 200 opens the air inlet, the flap portion 200 slides along the guide groove 121 toward the rear surface of the grill, and thus, it is possible to prevent the flap portion 200 from protruding to the outside of the grill.

Conversely, when the flap portion 200 closes the air inlet, in a case where the flap portions 200 close the air inlet, as illustrated in the drawings, when the driven gear 320 is rotated clockwise based on FIG. 8 according to the operation of the gear unit 500, the rotation rod 310 integrally fixed to the driven gear 320 is rotated clockwise together, and the first link member 341 fixed to the rotation rod 310 is rotated clockwise together with the rotation rod 310.

In addition, one end of the second link member 343 having the other end rotatably coupled to the first link member 341 is rotatably coupled to the guide rod 330, and thus, when the first link member 341 is rotated clockwise, the second link member 343 pushes the guide rod 330 in the rotational direction of the first link member 341.

In this case, when the guide rod 330 is pushed in the rotational direction of the first link member 341 by the second link member 343, the guide rod 330 slides along the guide groove 121.

Accordingly, when the guide rod 330 slides along the guide groove 121, the flap portion 200 closes the air inlet while moving along the guide rod 330.

For this reason, when the flap portion 200 closes the air inlet, the front surface of the flap portion 200 in the outward direction of the vehicle and the front surface of the grill can be integrated.

Meanwhile, the connection unit 300 including the rotation rod 310, the driven gear 320, the guide rod 330, and the link unit 340 includes a first connection unit 300_1, a second connection unit 300_2, and a third connection unit 300_3.

The first connection unit 300_1 is connected to the first unit 230_1 disposed on a horizontal end portion of the horizontal frame 120.

Accordingly, the first connection unit 300_1 operates the flap portions 200 of the first unit 230_1 according to the operation of the gear unit 500.

The second connection unit 300_2 is spaced a distance from the first connection unit 300_1 and is connected to the second unit 230_2 disposed to be spaced the distance from the first unit 230_1 in the horizontal frame 120.

Accordingly, the second connection unit 300_2 operates the flap portions 200 of the second unit 230_2 according to the operation of the gear unit 500.

The third connection unit 300_3 is spaced a distance from the second connection unit 300_2 in a direction opposite to the direction, in which the first connection unit 300_1 is disposed, and is connected to the third unit 230_3 disposed in the horizontal frame 120 in a direction opposite to the direction, in which the first unit 230_1 is disposed, from the second unit 230_2.

Accordingly, the third connection unit 300_3 operates the flap portions 200 of the third unit 230_3 according to the operation of the gear unit 500.

As illustrated in FIGS. 3 and 4, the actuator 400 is coupled to the outside of the frame 100, i.e., to the outside of the horizontal frame 120 disposed on the upper side, and generates power.

A rotating shaft 410 is coupled to the actuator 400.

The rotating shaft 410 extends from the actuator 400 to the inside of the horizontal frame 120.

Preferably, the rotating shaft 410 passes through the horizontal frame 120 disposed on the upper portion and the horizontal frame 120 disposed on the lower portion.

Accordingly, both ends of the rotating shaft 410 protrude from the outside of the horizontal frame 120.

The rotating shaft 410 transmits the power generated from the actuator 400 to the gear unit 500.

The gear unit 500 transmits the power generated from the actuator 400 to the flap portions 200.

The gear unit 500 includes a pinion gear 510, a rack gear 520, and a gear cover 530.

The pinion gear 510 is coupled to the end portion of the rotating shaft 410 passing through the horizontal frame 120 disposed on the upper portion and the horizontal frame 120 disposed on the lower portion.

Specifically, the pinion gear 510 is coupled to the end portion of the rotating shaft 410 protruding to the outside of the horizontal frame 120 disposed on the lower portion as illustrated.

Then, the pinion gear 510 is rotated by receiving the power of the actuator 400 from the rotating shaft 410 connected to the actuator 400.

The rack gear 520 is disposed in the direction toward the engine room on the horizontal frame 120 disposed thereunder.

Then, the rack gear 520 engages the pinion gear 510 and the driven gear 320 and moves in the horizontal direction according to the power of the actuator 400 transmitted from the pinion gear 510.

The rack gear 520 also rotates the driven gear 320 according to the rotation of the pinion gear 510 receiving power from the actuator 400.

Accordingly, the rack gear 520 may operate the flap portion 200 by the link unit 340 connected to the rotation rod 310 by rotating the rotation rod 310 coupled to the driven gear 320.

For this reason, the flap portion 200 may open or close the air inlet along the guide groove 121 of the horizontal frame 120 by the actuator 400, the gear unit 500, and the connection unit 300.

The rack gear 520 includes a gear base portion 521, a first gear 522, a second gear 523, and a third gear 524.

The gear base portion 521 constitutes the body of the rack gear 520 and extends in the horizontal direction along the horizontal frame 120.

The first gear 522 is formed on the gear base portion 521 and extends in a direction toward the driven gear 320 and pinion gear 510.

The first gear 522 is formed at a position of the gear base portion 521 corresponding to the first connection unit 300_1 disposed on the horizontal end portion of the horizontal frame 120.

Moreover, the first gear 522 is selectively engaged with the driven gear 320 of the first connection unit 300_1.

Specifically, when the rack gear 520 operates in the horizontal direction according to the operation of the actuator 400 as illustrated in FIG. 9A, the first gear 522 is engaged with the driven gear 320 of the first connection unit 300_1, or the driven gear 320 of the first connection unit 300_1 is disposed in a first space 525 to be described below.

That is, when the first gear 522 is engaged with the driven gear 320 of the first connection unit 300_1, the flap portions 200 of the first unit 230_1 connected to the first connection unit 300_1 is operated.

The second gear 523 is formed on the gear base portion 521 and extends in a direction toward the middle gear and the pinion gear 510.

The second gear 523 is formed at a position of the gear base portion 521 spaced apart from the first gear 522.

That is, the first space 525 is formed between the first gear 522 and the second gear 523 in the gear base portion 521.

Moreover, the second gear 523 is selectively engaged with the driven gear 320 of the second connection unit 300_2.

Specifically, when the rack gear 520 operates in the horizontal direction according to the operation of the actuator 400 as illustrated in FIG. 9B, the second gear 523 is engaged with the driven gear 320 of the second connection unit 300_2, or the driven gear 320 of the second connection unit 300_2 is disposed in a second space 526 to be described below.

That is, the second gear 523 operates the flap portions 200 of the second unit 230_2 connected to the second connection unit 300_2 while being engaged with the driven gear 320 of the second connection unit 300_2.

The third gear 524 is formed in the gear base portion 521 and extends in the directions of the driven gear 320 and the pinion gear 510, like the first gear 522 and the second gear 523.

The third gear 524 is formed at a position of the gear base portion 521 spaced apart from a direction opposite to the first gear 522 spaced apart from the second gear 523.

That is, the second space 526 is formed between the second gear 523 and the third gear 524 in the gear base portion 521.

Moreover, the third gear 524 is selectively engaged with the driven gear 320 of the third connection unit 300_3.

Specifically, when the rack gear 520 operates in the horizontal direction according to the operation of the actuator 400 as illustrated in FIG. 9C, the third gear 524 is engaged with the driven gear 320 of the third connection unit 300_3, or the driven gear 320 of the third connection unit 300_3 is disposed at a position deviated from the third gear 524.

That is, the third gear 524 operates the flap portions 200 of the third unit 230_3 connected to the third connection unit 300_3 while being engaged with the driven gear 320 of the third connection unit 300_3.

Meanwhile, the third gear 524 is formed at a position of the gear base portion 521 spaced apart from the second gear 523 by a distance greater than a distance between the first gear 522 and the second gear 523.

That is, the space between the third gear 524 and the second gear 523, that is, the second space 526, is greater than the space between the first gear 522 and the second gear 523, that is, the first space. 525.

Accordingly, in the rack gear 520 of the present disclosure in which the distance between the first gear 522 and the second gear 523 and the distance between the second gear 523 and the third gear 524 are different from each other, when the rack gear 520 is operated in the horizontal direction by the actuator 400, as illustrated in FIG. 9A, the first gear 522 and the driven gear 320 of the first connection unit 300_1 are engaged with each other first.

Then, as illustrated in FIG. 9B, the second gear 523 and the driven gear 320 of the second connection unit 300_2 are engaged with each other, and then, as illustrated in FIG. 9C, the third gear 524 and the driven gear 320 of the third connection unit 300_3 are engaged with each other.

Accordingly, as illustrated in FIGS. 9A to 9C, the flap portions 200 of the first unit 230_1, the flap portions 200 of the second unit 230_2, and the flap portions 200 of the third unit 230_3 are sequentially operated according to the distances between the first gear 522 engaged with the driven gear 320 of the first connection unit 300_1, the second gear 523 engaged with the driven gear 320 of the second connection unit 300_2, and the third gear 524 engaged with the driven gear 320 of the third connection unit 300_3.

In addition, in the rack gear 520, it is possible to adjust an opening/closing order and an opening/closing timing of the flap portions 200 of the first unit 230_1 to the third unit 230_3 by changing the design of the first gear 522 to the third gear 524 formed on the gear base portion 521 to adjust the distances therebetween.

For this reason, in the active air flap apparatus for a vehicle of the present disclosure, the air inlet of the grill is sequentially opened or closed, and thus, it is possible to improve the design sensibility of the grill.

In addition, by individually opening or closing the flap portions 200 of the first unit 230_1, the flap portions 200 of the second unit 230_2, and the flap portions 200 of the third unit 230_3, it is possible to remarkably reduce the air resistance introduced from the outside of the grill while the vehicle travels, and effectively open or close the flap portions 200 of the first unit 230_1 to the third unit 230_3 even when using an actuator 400 having a low performance.

The gear cover 530 is provided as a pair of gear covers, and the gear covers 530 are coupled to the rear surface of the horizontal frame 120 disposed on the upper side and the rear surface of the horizontal frame 120 disposed thereunder to seal the driven gear 320, the pinion gear 510, and the rack gear 520.

The gear cover 530 prevents foreign substances from entering the driven gear 320, the pinion gear 510, and the rack gear 520.

Accordingly, the gear cover 530 can effectively prevent the opening or closing of the flap portion 200 from malfunctioning due to inflow of foreign substances into the periphery of the rack gear 520 from the outside.

As such, the embodiments disclosed in this specification should be considered from an exemplary point of view for description rather than a limiting point of view. The scope of the present disclosure is indicated in claims rather than the foregoing description, and all differences within an equivalent scope should be construed as being included in the present disclosure.

According to the present disclosure, when the guide rod slides along the guide groove, the flap portion closes the air inlet while moving along the guide rod. Therefore, when the flap portion closes the air inlet, the front surface of the flap portion in the outward direction of the vehicle and the front surface of the grill can be integrated.

Moreover, the flap portions of the first unit, the flap portions of the second unit, and the flap portions of the third unit are sequentially operated according to the distances between the first gear engaged with the driven gear of the first connection unit, the second gear engaged with the driven gear of the second connection unit, and the third gear engaged with the driven gear of the third connection unit. Therefore, the air inlet of the grill is sequentially opened or closed, and thus, it is possible to improve design sensibility of the grill.

In addition, by individually opening or closing the flap portions of the first unit, the flap portions of the second unit, and the flap portions of the third unit, it is possible to remarkably reduce the air resistance introduced from the outside of the grill while the vehicle travels and effectively open or close the flap portions of the first unit to the third unit even when using an actuator having a low performance.

What is claimed is:

1. An active air flap apparatus for a vehicle, comprising:
   a frame coupled to a rear surface of a grill in which an air inlet is disposed;
   a plurality of flap portions coupled to an inside of the frame to open or close the air inlet and arranged in a vertical direction of the frame;
   an actuator coupled to an outside of the frame to generate power;
   a gear unit operated by the power generated from the actuator; and
   a connection unit connecting the plurality of flap portions and the gear unit to each other to operate the plurality of flap portions according to an operation of the gear unit,
   wherein the frame includes:
      two vertical frames disposed to be spaced from each other by a distance; and
      two horizontal frames disposed on upper end portions and lower end portions of the vertical frames to connect the two vertical frames to each other,
   wherein the horizontal frames include a plurality of guide grooves, which guides an operation direction of the connection unit when the power is generated by the actuator, and
   wherein the connection unit includes:
      a plurality of rotation rods connected to the gear unit;
      a plurality of guide rods which is inserted into the respective guide grooves and coupled to the plurality of flap portions which are spaced from each other by a distance in a longitudinal direction; and
      a plurality of link units, a number of which corresponds to that of the plurality of flap portions, respectively connecting the rotation rods and the guide rods to each other.

2. The active air flap apparatus for a vehicle of claim 1, wherein each of the plurality of flap portions includes:
   a body portion configured to open or close the air inlet; and
   a coupling unit extending in a direction toward an engine room from a rear surface of the body portion and coupled to the connection unit.

3. The active air flap apparatus for a vehicle of claim 1, wherein the connection unit further includes a driven gear coupled to an end portion of each of the rotation rods and, the driven gear being engaged with the gear unit to receive power from the gear unit and configured to rotate each of the rotation rods.

4. The active air flap apparatus for a vehicle of claim 3, wherein a rotating shaft passing through the horizontal frames is coupled to the actuator, and the actuator is fixed outside the horizontal frames to transmit power to the gear unit.

5. The active air flap apparatus for a vehicle of claim 4, wherein the gear unit includes:
   a pinion gear connected to an end portion of the rotating shaft and rotatable by receiving the power from the actuator;
   a rack gear engaged with the pinion gear and the driven gear and configured to rotate the rotation rods according to the power of the actuator transmitted from the pinion gear; and
   a gear cover sealing the driven gear, the pinion gear, and the rack gear.

6. The active air flap apparatus for a vehicle of claim 1, wherein a first end of each of the rotation rods is coupled to the horizontal frame disposed on an upper side and a second end of each of the rotation rods is coupled to the horizontal frame disposed on a lower side to connect the two horizontal frames to each other.

7. The active air flap apparatus for a vehicle of claim 1, wherein each of the plurality of flap portions includes:
   a body portion configured to open or close the air inlet; and
   a coupling unit extending in a direction toward an engine room from a rear surface of the body portion and coupled to the connection unit,
   wherein the corresponding guide rod passes through the coupling unit and is coupled to the corresponding flap portion.

8. The active air flap apparatus for a vehicle of claim 1, wherein the plurality of guide rods are disposed adjacent to the plurality of flap portions, respectively, and
   the plurality of rotation rods are spaced by a distance from the plurality of guide rods, respectively, in a direction toward an engine room.

9. The active air flap apparatus for a vehicle of claim 1, wherein each of the plurality of link units includes:
   a first link member having a first end fixed to the corresponding rotation rod and configured to rotate together with the corresponding rotation rod; and
   a second link member having a first end rotatably coupled to the first link member and a second end rotatably coupled to the corresponding guide rod.

10. An active air flap apparatus for a vehicle, comprising:
    a frame coupled to a rear surface of a grill in which an air inlet is disposed;
    a plurality of flap portions coupled to an inside of the frame to open or close the air inlet and arranged in a vertical direction of the frame;
    an actuator coupled to an outside of the frame to generate power;
    a gear unit operated by the power generated from the actuator; and
    a connection unit connecting the plurality of flap portions and the gear unit to each other to operate the plurality of flap portions according to an operation of the gear unit,
    wherein the plurality of flap portions constitute a plurality of flap units arranged in a horizontal direction,
    wherein the frame includes:

two vertical frames disposed to be spaced from each other by a distance; and two horizontal frames disposed on upper end portions and lower end portions of the vertical frames to connect the two vertical frames, wherein the horizontal frames include a plurality of guide grooves, which guides an operation direction of the connection unit when the power is generated by the actuator, and wherein the connection unit includes:

a plurality of rotation rods connected to the gear unit;

a plurality of guide rods which is inserted into the respective guide grooves and coupled to the plurality of flap portions which are spaced from each other by a distance in a longitudinal direction; and a plurality of link units, a number of which corresponds to that of the plurality of flap portions, respectively connecting the rotation rods and the guide rods to each other.

11. The active air flap apparatus for a vehicle of claim 10, wherein the plurality of flap units includes:

a first unit disposed at a center of the horizontal frames in the horizontal direction;

a second unit disposed on the horizontal frames spaced from the first unit by a distance; and a third unit disposed on the horizontal frames in a direction opposite to the direction in which the first unit is disposed from the second unit.

12. The active air flap apparatus for a vehicle of claim 11, wherein the connection unit further includes:

a first connection unit connected to the first unit;

a second connection unit spaced from the first connection unit by a distance and connected to the second unit; and a third connection unit spaced a distance from the second connection unit in a direction opposite to a direction in which the first connection unit is disposed and connected to the third unit.

13. The active air flap apparatus for a vehicle of claim 12, wherein a rotating shaft passing through the horizontal frames is coupled to the actuator, the gear unit includes:

a pinion gear connected to an end portion of the rotating shaft and rotatable by receiving the power from the actuator; and a rack gear configured to selectively rotate the rotation rods according to the power of the actuator transmitted from the pinion gear, and the rack gear includes:

a gear base portion forming a body;

a first gear disposed at the gear base and engaged with a driven gear of the first connection unit;

a second gear disposed at a position of the gear base portion spaced apart from the first gear and selectively engaged with a driven gear of the second connection unit; and a third gear disposed at a position of the gear base portion spaced apart from the second gear by a distance greater than a distance between the first gear and the second gear, the third gear being selectively engaged with a driven gear of the third connection unit.

14. The active air flap apparatus for a vehicle of claim 13, wherein the first unit, the second unit, and the third unit sequentially operate according to respective distances between the first gear engaged with the driven gear of the first connection unit, the second gear engaged with the driven gear of the second connection unit, and the third gear engaged with the driven gear of the third connection unit.

15. The active air flap apparatus for a vehicle of claim 13, wherein the actuator is fixed outside the horizontal frames to transmit power to the gear unit.

* * * * *